Patented Mar. 30, 1943

2,315,410

UNITED STATES PATENT OFFICE 2,315,410

FILTER POWDER

Ogden Fitz Simons and Robert G. Capell, Warren, Pa., assignors to Floridin Company, Warren, Pa., a corporation of Delaware No Drawing. Application May 11, 1939,
Serial No. 273,146

2 Claims. (Cl. 252—89)

This invention relates to a filter powder which is useful as an absorbent and filter aid, particularly in the dry cleaning industry.

In the usual methods of dry cleaning, the material to be cleaned is treated in a washer with a solvent such as naphtha, dichlorethylene, carbon tetrachloride, or the like. The circulation of the solvent through the washer is usually maintained by means of a pump which forces the solvent from the washer to a filter and thence back to the washer. The filter is usually of the well-known leaf or bag types, having screens of fine mesh.

In order to prevent the accumulation of lint and other material which would render the filtering screens impervious, it is customary to add to the circulating solvent a material known as a filter aid; for example, diatomaceous earth. It is also customary to add an adsorbent material such as activated clay, activated carbon, Olmstead fuller's earth, Texas fuller's earth, or the like, for the purpose of adsorbing color and acids from the solvent.

In order to prevent the accumulation of the filter aid or adsorbent substance in the material to be cleaned, they are usually added to a sump which is located between the washer and the pump in order that they will be collected upon or stopped by the filter. However the filter aid and adsorbent may be added to the solvent in the washer, thereby eliminating the necessity of a sump.

Efforts have long been made to find or develop materials which would be efficient adsorbents for color and fatty acids and which would also serve as efficient filter aids thereby permitting a high filter rate, and the object of this invention is the provision of such material.

The composition of the present invention is a specially treated fuller's earth of the Georgia-Florida type commonly called "Floridin" i. e., that body of fuller's earth found in Gadsden, Liberty and adjoining counties in Florida, and extending over into Decatur and adjoining counties in Georgia. This deposit, which lies across the Georgia-Florida State line, is separate and distinct and is in no way related to the deposits found in Ocala, Florida, and Macon, Georgia. The reference to Georgia-Florida fuller's earth in the claims is intended to cover fuller's earth as just aforementioned. Efforts have heretofore been made to use this type of fuller's earth in dry cleaning processes, but these efforts have not been successful in spite of the fact that it has an adsorption efficiency for acids and coloring matter of one and one half to five times that of other natural fuller's earths. When placed in the circulating solvent and deposited upon the screens, it produces excellent adsorption of acids and coloring matter for a limited period of time but gradually the pressure builds up until the cake becomes impervious to the solvent, necessitating the shutting down of the apparatus and cleaning of the screens. Not only does the Georgia-Florida fuller's earth render the screens impervious but, by reason of the fact that its particles become wedged in the mesh of the screen, it is extremely difficult to remove.

The present invention is based upon the discovery that the development of imperviousness and also the tendency of the material to cling to the screens, is due to the adsorption of water by the material which causes the particles to swell. The water, introduced chiefly by the materials being cleaned, and as a constituent of the detergent used, is picked up and dissolved in the solvent and when it reaches the earth in the filter it is immediately adsorbed, with the result that the earth soon adsorbs a sufficient amount of water to bring about swelling.

The Georgia-Florida earth which has been used with the above described difficulties is the commercial grade containing from 6 to 8% of water of hydration (combined water). For example, when a commercial grade of such earth containing 7% combined water was used in a commercial dry cleaning plant, using a synthetic chlorinated solvent, pressures would gradually build up by the end of a day's operation, so that the flow rate would markedly decrease. At maximum pressure, the pump in this unit exerted a pressure of twenty-five pounds per square inch, indicating a very low rate of circulation. Scrapers were installed on the screens, but even when the screen was scraped, it was found that only a slight decrease in pressure occurred. The earth entered the pores of the metal screen and blocked the flow of solvent, so that it was necessary to boil the screens in dilute caustic and use a 300 lbs. per square inch water stream to clean the screens.

We have found that when the same earth is heated, before use, to a temperature which will reduce the content of water of hydration content to less than 6%, the above mentioned difficulties are eliminated. For example, the same material, which had been heated at approximately 900° F. to reduce the water of hydration content to 3%, was added in the same plant, in small amounts, several times daily for a period of sixty days and at no time was it necessary to scrape the screens. It was found that when the cake built up to a thickness which materially diminished the rate of flow, as shown by a pressure decrease on resuming operation, it apparently dropped off the screens during an overnight shutdown. After sixty days of successful operation, the pressure reached twenty pounds per square inch and the filter was opened for examination. It was found that sixty pounds of clay cake had dropped into a sump below the filter and an even porous cake 1.2 inches thick was found on the screens. It had been the practice in this plant to redistill the solvent weekly, but during this entire period, distillation was unnecessary and even at the end of the period the solvent had only a tinge of color and low fatty acid content. Distillation was necessary at this time, however, due to increase in soluble oils which resulted in oil swales or rings.

From the foregoing it will be appreciated that when the same material, but prepared in accordance with this invention is added in equal amount over the same time period to the dry cleaning fluid composition, 50 percent more clothes can be cleaned than with the untreated clay, i. e., as formerly prepared before the pressure on the dry cleaner filter would rise to 20 pounds per square inch.

Further investigation shows that the Georgia-Florida fuller's earth is made permeable to fluids, even when water saturated, if its content of water of hydration is reduced to less than 6% but preferably not less than 1½%. A cake of the fuller's earth has been found to be absolutely impervious to naphtha if the water of hydration content is as high as 6% but is permeable to naphtha when the water of hydration content is reduced below 6%. Furthermore, optimum filtering rates are obtained if the content of water of hydration is between 1½% and 4%.

It has also been found upon further investigation that the proportion of combined water greatly affects the color adsorption and the fatty acid adsorption. The color adsorption increases as the combined water content is decreased, and optimum color adsorption occurs when the content of water of hydration is between 1% and 6%. While the fatty acid adsorption increases as the water of hydration content increases, the degree of adsorption is satisfactory if the water of hydration content is kept between 1 and 6%.

Since the filtering rate changes very slowly over the range of 1½ to 4% of combined water and since a relatively high acid adsorption is necessary for an ideal filter powder, it is preferable to keep the combined water as high as is consistent with a good filtering rate and therefore the preferred embodiment of the invention consists in the treatment of the Georgia-Florida fuller's earth to obtain a combined water content of from 3% to 4%.

While the temperature at which the fuller's earth must be treated in order to obtain the desired content of water of hydration cannot be given precisely owing to variations in different samples of the earth, it is known that, for any given earth of the Georgia-Florida type, the water of hydration will be given off at progressively increasing rates as the temperature is increased from approximately 212° F. to 1800° F. Furthermore, if the material is held at any intermediate temperature, an equilibrium will be established and the content of water of hydration will be relatively constant. For example, with certain earths of this type if the material is held at 600° F. for a period of time sufficient to thoroughly heat the entire mass, an equilibrium will be established when the water of hydration reaches approximately 6%. By heating to a temperature of approximately 900° F. a combined water content of approximately 3% can be obtained, and when the material is heated to 1200° F. the resulting combined water content is approximately 1%. As indicated above, these temperatures are only approximate but the water of hydration content resulting from any particular heat treatment can be ascertained with reasonable accuracy by weighing a sample of the material to be tested, after heating to a temperature somewhat above 212° F. to remove free and adsorbed water and then determining its loss in weight after all water of hydration has been removed by treatment at a temperature of 1800° F.

Other substances may be added to the above described filter powder for special purposes. For example, a small amount of activated carbon is frequently added to remove red colors which are not completely removed by the fuller's earth alone. Furthermore, it is customary for dry cleaners to add detergents to the solvent from time to time, particularly when washing silks, and it has been found that when this is done in connection with the use of the specially treated Georgia-Florida fuller's earth, remarkably superior results are obtained. Also, the material can be improved by incorporating a small percentage (less than 5%) of an alkaline earth oxide, such as lime or magnesia, in the clay, for the purpose of neutralizing acids. Small percentages (5% to 10%) of diatomaceous earth will also cause some improvement by preventing escape of extremely fine material through the screens.

It is preferred that all of the material comprising the filter powder should be finer than 150 microns and preferably of the order of 75 microns. A fine mesh is desirable because the adsorption efficiency varies in proportion to the surface area of the material. However, we have found that the product is enhanced by removing, by means of air separation, material finer than about ten microns. This extremely fine material has a very high surface energy and by reason of the resulting adsorption phenomenon, it sticks to the fibers of the clothes.

We also find that extrusion of moist raw clay at pressures in excess of 100 pounds per square inch before reducing its combined water content, as disclosed by Patent No. 2,079,854, Hartshorne, May 11, 1937, improves the decolorization and acid adsorption properties of the material. Furthermore, if the material is extruded, any desired additional ingredients can be added during the pugging operation which precedes the extruding step or in the extrusion.

The material may be used in the same manner as diatomaceous earth, being added either in the washer or in a sump. It is desirable to add the earth in small portions and, where a detergent is used, it is desirable to allow the washer to run for a sufficient length of time to thoroughly wash the garments before the earth is added. The earth may then be added to the washer at the same time circulation is restored. In this manner each particle of clay adsorbs a portion of the detergent, whereas, if the clay is deposited on the filter press and circulation is then restored, the detergent will lie in a thick layer on the surface of the earth cake, due to the high adsorbent capacity of the earth for the detergent, with the result that the filter rate will decrease. This difficulty is eliminated by supplying the fuller's earth in relatively small amounts and after each wash.

A high filter rate through the filter which the use of the improved filter powder makes possible, is highly desirable, particularly when the earth is added at the washer, since otherwise it sometimes occurs that not all of the earth will be swept out and deposited on the filter, with the result that the clothes will retain some of the earth and show signs of dustiness after being cleaned.

We claim:

1. The method of preparing filter powder for incorporation in a dry cleaning fluid as a filter-aid and for adsorbing color and fatty acids from the cleaning fluid which comprises heating from approximately 212° F. to 1800° F. Georgia-Florida fuller's earth until substantially all of the free water is removed and until the water of hydration is less than 6% and not less than 1% and the earth on grinding to a size finer than 150 microns will exert the properties of a filter aid and adsorb color and fatty acids when incorporated in a cleaning fluid to an extent as will allow 50% more clothes to be cleaned in the same time period than with an equal amount of untreated clay, and grinding the earth to a size finer than 150 microns.

2. A dry cleaning fluid composition comprising filter powder useful as a filter-aid in dry cleaning processes and having color and fatty acid adsorptive properties comprising Georgia-Florida fuller's earth containing less than 6% and not less than 1% water of hydration.

OGDEN FITZ SIMONS.
ROBERT G. CAPELL.